(12) United States Patent
Gustafson et al.

(10) Patent No.: US 8,313,227 B2
(45) Date of Patent: Nov. 20, 2012

(54) DOUGH EXTRACTION SYSTEM FOR BATCH MIXER

(75) Inventors: Craig E. Gustafson, Bloomington, MN (US); Thomas E. Heinzen, Burnsville, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 895 days.

(21) Appl. No.: 11/961,329

(22) Filed: Dec. 20, 2007

(65) Prior Publication Data

US 2009/0161478 A1 Jun. 25, 2009

(51) Int. Cl.
*B01F 15/02* (2006.01)
*B01F 7/02* (2006.01)
(52) U.S. Cl. .......................................................... 366/77
(58) Field of Classification Search .................... 30/182; 366/325.8, 77, 96, 97, 98, 99, 184, 189, 195, 366/297; 425/142, 238–239
See application file for complete search history.

(56) References Cited

U.S. PATENT DOCUMENTS

| | | | | |
|---|---|---|---|---|
| 1,057,231 A | * | 3/1913 | Frischmann | 425/240 |
| 1,162,898 A | * | 12/1915 | Baker et al. | 425/238 |
| 1,228,550 A | * | 6/1917 | Goger | 366/97 |
| 1,423,371 A | * | 7/1922 | Vierow | 425/239 |
| 1,750,558 A | * | 3/1930 | Zettergren | 366/95 |
| 2,112,927 A | * | 4/1938 | Pierre | 366/99 |
| 2,155,454 A | * | 4/1939 | Temple | 220/213 |
| 2,221,327 A | * | 11/1940 | Rhodes | 425/147 |
| 2,992,813 A | * | 7/1961 | Bonomo et al. | 366/97 |
| 3,150,836 A | * | 9/1964 | Krahe | 241/117 |
| 3,708,255 A | * | 1/1973 | Schertz et al. | 425/287 |
| 3,722,834 A | | 3/1973 | Bakewell | |
| 3,882,768 A | * | 5/1975 | Troisi et al. | 99/352 |
| 3,937,608 A | * | 2/1976 | Farrant et al. | 425/159 |
| 3,988,096 A | * | 10/1976 | Papalexis et al. | 425/145 |
| 4,010,932 A | * | 3/1977 | Otto | 366/70 |
| 4,159,740 A | | 7/1979 | Seiling | |
| 4,275,568 A | | 6/1981 | Zielsdorf | |
| 4,332,538 A | * | 6/1982 | Campbell | 425/140 |
| 4,630,930 A | | 12/1986 | Seiling | |
| 4,676,727 A | * | 6/1987 | Atwood | 425/142 |
| 4,832,961 A | * | 5/1989 | Aoki | 425/239 |
| 4,902,524 A | * | 2/1990 | Morikawa et al. | 426/503 |
| 5,176,069 A | * | 1/1993 | Chen | 99/348 |
| 5,200,203 A | * | 4/1993 | Hayashi | 425/142 |
| 5,266,341 A | * | 11/1993 | Morikawa et al. | 426/231 |
| 5,314,322 A | * | 5/1994 | Morikawa et al. | 425/142 |
| 5,322,368 A | * | 6/1994 | Tanaka et al. | 366/76.6 |
| 5,458,415 A | * | 10/1995 | Poilane | 366/138 |
| 5,593,712 A | * | 1/1997 | Poilane | 426/19 |

(Continued)

*Primary Examiner* — Tony G Soohoo
(74) *Attorney, Agent, or Firm* — John L. Crimmins; Everett G. Diederiks, Jr.

(57) ABSTRACT

A cutting mechanism is mounted to a tub of a dough mixing apparatus including an internal mixing chamber having a rotatable agitator assembly for forming dough. After the dough is formed, the tub is rotated and the cutting mechanism is automatically shifted from a non-cutting position, wherein an elongated blade element of the cutting mechanism is located remote from the agitator assembly so as to not interfere with the dough forming process in the internal mixing chamber, to a cutting position, wherein the elongated blade element is arranged directly adjacent an operational path of mixing elements of the agitator assembly to slice the dough, whereupon the dough readily falls from the agitator assembly for enhanced discharge of the dough from the tub. The cutting mechanism can be integrated into a breaker bar or separately mounted in the tub.

22 Claims, 18 Drawing Sheets

U.S. PATENT DOCUMENTS

| | | | |
|---|---|---|---|
| 5,630,358 A * | 5/1997 | Patel | 99/349 |
| 5,728,411 A * | 3/1998 | Fowler | 425/142 |
| RE36,147 E * | 3/1999 | Backus et al. | 425/209 |
| 6,290,383 B1 * | 9/2001 | Shohet | 366/132 |
| 6,863,429 B2 | 3/2005 | Torghele et al. | |
| 6,915,734 B2 * | 7/2005 | Torghele et al. | 99/348 |
| 2005/0050858 A1 * | 3/2005 | Cremers et al. | 53/445 |
| 2009/0245016 A1 * | 10/2009 | Oki et al. | 366/182.4 |
| 2010/0091608 A1 * | 4/2010 | Oki et al. | 366/182.3 |

* cited by examiner

DOUGH EXTRACTION SYSTEM FOR BATCH MIXER

FIELD OF THE INVENTION

The invention pertains to the art of preparing dough and, more particularly, to a system and method for automatically extracting dough from a batch mixer.

BACKGROUND

In making dough products, it is common to introduce required ingredients into a bowl or other container and employ a mixer to automatically combine the ingredients in order to establish a mass of dough. In connection with the mass production of dough products, various different types of mixers are known, including screw conveyor systems, vertical axis arrangements and horizontal mixing devices. Each of these types of mixers have their own advantages and disadvantages. For instance, with respect to the horizontal mixing devices, removal of the dough mass after production can be extremely time consuming. In general, the bowl or tub of a horizontal mixer is generally U-shaped in side view, leaving an open section for receiving the necessary ingredients to form the dough. The tub is quite large, generally accommodating the formation of between 500-3000 lbs. of dough per batch. The tub houses a plurality of elongated mixer or kneading bars which are interconnected through spaced carrier plates such that the bars rotate in unison within the tub to perform the mixing process. In some designs, a static breaker bar may extend between side walls of the tub in order to provide an additional pinch zone for the dough during the mixing process.

With these horizontal mixers, the tub can either have a selectively opened lower discharge port or the tub itself can rotate from an upright, charge receiving and mixing position wherein the open section is upwardly exposed, to a dough removal position wherein a shell of the tub is rotated until the open section is angled downwardly. In either case, gravity is employed to aid in removal of the dough mass from the tub. However, given the existence of the mixing bars and the sticky nature of the dough itself, further operations need to be preformed to assist in the dough removal process. These operations can include manually slicing the dough at strategic locations and/or spraying the dough with oil for lubrication purposes. For instance, it is known to employ a cutting instrument, almost in the form reminiscent of a medieval axe with a cutting blade at the end of an elongated shaft, for slicing the dough along each mixer bar, thereby enabling the weight of the dough to force the mass out of the tub.

Obviously, this manual cutting operation represents hard work, requiring an overhead reaching and cutting motion on the part of the operator. In addition to being a time consuming task, this process is simply not consistent from operator to operator. Even though leaving a relatively minor amount of dough in the tub for the next batch forming process is acceptable, significantly varying the remaining amount can eventually lead to unacceptable variations in the final products produced. Furthermore, the cutting instruments utilized in accordance with the known prior art require routine sharpening, typically ranging from once every few days up to several times per each operator shift. In any case, although dough has been satisfactorily produced in this fashion for decades, a more efficient and effective dough extraction system would be quite beneficial.

SUMMARY

The invention is directed to incorporating a cutting mechanism into a dough mixing apparatus, such as a horizontal batch mixer. The dough mixing apparatus includes a tub defining an internal mixing chamber that is adapted to be charged with ingredients that are mixed by an agitator assembly rotatably mounted within the internal mixing chamber of the tub. After the ingredients are mixed to form the dough and the dough is suitably kneaded by the agitator assembly, the tub is rotated and the cutting mechanism is automatically shifted from a non-cutting position, wherein an elongated blade element of the cutting mechanism is located remote from the agitator assembly so as to not interfere with the mixing of the ingredients in the internal mixing chamber, to a cutting position, wherein the elongated blade element is arranged directly adjacent an operational path of mixing elements of the agitator assembly. After shifting of the blade element to the cutting position, the agitator assembly is rotated which causes portions of the mass of dough in the internal mixing chamber to be delivered to the blade element and sliced, whereupon the dough readily falls from the mixing elements for enhanced discharge of the dough from the tub.

In accordance with one embodiment of the invention, the cutting mechanism is integrated into a breaker bar provided in the internal mixing chamber to establish an additional pinch zone used for formation of the dough. An internal linear actuator is provided within the breaker bar and used in combination with a cam and slot arrangement to rotate a tube to which the blade element is attached. With this arrangement, shifting of the linear actuator causes the blade element to be selectively moved between the non-cutting and cutting positions. The camming arrangement incorporates terminal lock positions which minimize the linear force needed to maintain the blade element in at least the cutting position. In accordance with other embodiments of the invention, the blade element is mounted within the tub and shifted by one or more actuators located outside the tub. These actuators can include linear actuators, gearing systems, a chain drive, a belt drive or the like. In accordance with a still further embodiment of the invention, the actuator used to shift the blade element between the non-cutting and cutting positions constitutes a spring biased lever arrangement.

Regardless of the particular configuration of the cutting mechanism and the manner in which its associated blade element is shifted between the non-cutting and cutting positions, the incorporation of the cutting mechanism of the invention provides a more efficient and effective dough extraction arrangement, particularly when used with batch mixers. Additional objects, features and advantages of the invention will become more readily apparent from the following detailed description of embodiments when taken in conjunction with the drawings wherein like reference numerals refer to corresponding parts in the several views.

DETAILED DESCRIPTION

Figure 1:
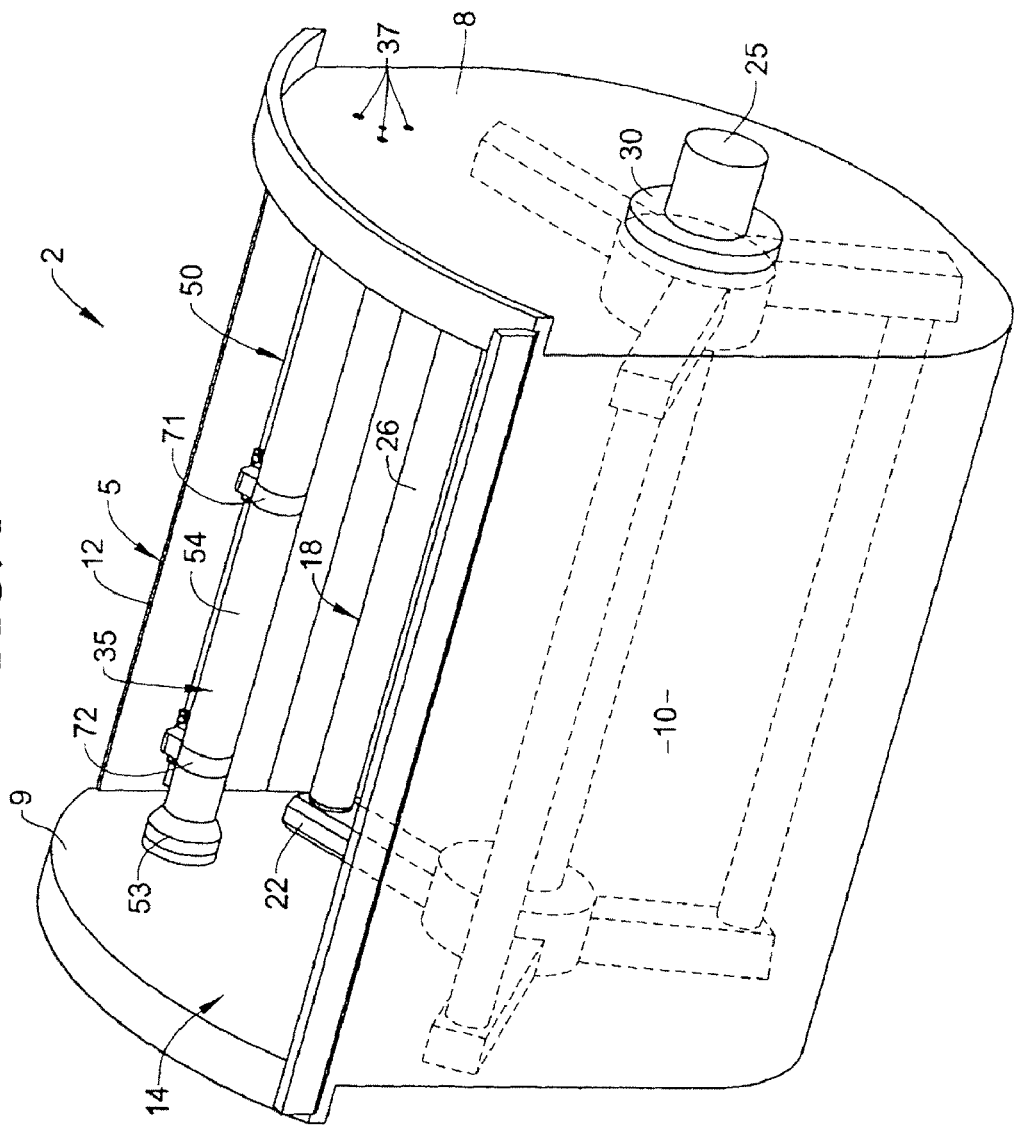
FIG. 1 is a perspective view of a horizontal dough mixer shown in a charging or mixing position and incorporating a cutting mechanism constructed in accordance with a first embodiment of the invention.

With initial reference to FIG. 1, a horizontal dough mixer constructed in accordance with the invention is generally indicated at 2. Dough mixer 2 includes a mixing bowl or tub 5 constructed with a first end wall 8, a second end wall 9 and an interconnecting side wall 10. As shown, side wall 10 is generally U-shaped in side-view and establishes an opening 12 that leads into an internal mixing chamber 14 for tub 5. Mounted within internal mixing chamber 14 is an agitator assembly 18. As shown, agitator assembly 18 includes first and second spaced carrier plates 21 and 22 across which extend a plurality of mixing elements 26 which take the form of mixing or kneading bars. Agitator assembly 18 includes a central shaft 28 which projects through first and second end walls 8 and 9, as well as through respective journals, one of which is indicated at 30.

In a manner known in the art, shaft 28 is adapted to be driven by a motor (not shown) in order to rotate agitator assembly 18 within tub 5 in order to perform a kneading action for making a batch of dough within tub 5. More specifically, tub 5 assumes a position shown in FIG. 1 for initial charging of ingredients through opening 12 into internal mixing chamber 14. Thereafter, shaft 28 is rotated to drive agitator assembly 18 to perform the kneading action in order to properly blend the ingredients. Typically, dry ingredients are initially added and thoroughly mixed by running agitator assembly 18, with a predetermined amount of moisture being added to complete the mix. Although the speed at which agitator assembly 18 operates can vary, it is generally known in the art to rotate agitator assembly 18 up to about 100 RPMs. In the embodiment shown, dough mixer 2 further includes a static breaker bar 35 which is secured between first and second end walls 8 and 9 by a plurality of fasteners, one of which is indicated at 37. During the mixing or kneading operation, breaker bar 35 functions to establish an additional pinch zone to enhance the overall formation of the dough.

In a manner known in the art, a horizontal dough mixer of the type described above is typically employed in the mass production of dough for commercial purposes. In accordance with an embodiment of the invention, tub 5 is dimensioned to form between 1,500 and 3,000 pounds of dough per batch. Once the dough is formed, tub 5 is rotated from the charging and mixing position shown in FIG. 1 to a dough removal position shown in FIGS. 2 and 3. In this position, the produced mass of dough is extracted from tub 5, mainly through the use of gravity. The description and operation of dough mixer 2 as set forth above is known in the art and is simply provided here for the sake of completeness. Although not shown, dough mixer 2 would also include a jacket surrounding tub 5, as well as suitable cooling structure interposed between these components, as is also known in the art. The invention is particularly directed to incorporating a cutting mechanism in connection with the overall dough extraction system as will now be detailed.

Figure 4:
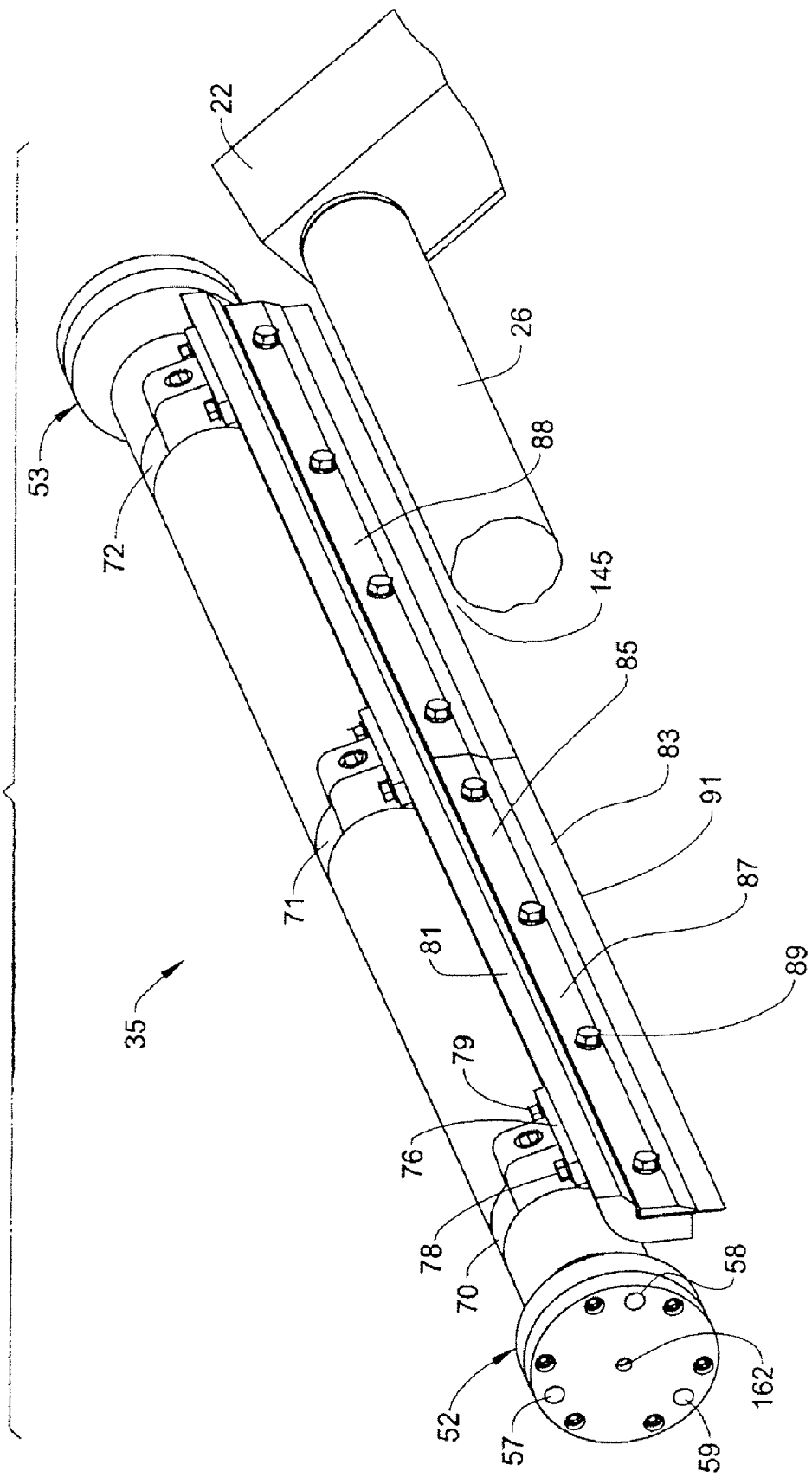
FIG. 4 is an enlarged perspective view of the cutting mechanism shown in FIGS. 1-3.

In accordance with this first embodiment of the invention, breaker bar 35 has been configured to incorporate a cutting mechanism 50. More specifically, as perhaps best shown in FIGS. 4 and 5, breaker bar 35 includes flared end portions 52 and 53, along with a central portion 54. Each of flared end portions 52, 53 is provided with a plurality of circumferentially spaced bores 57-59 which receive fasteners 37 for securing breaker bar 35 to first and second end walls 8 and 9. Breaker bar 35 includes an inner tube 62 spanning from adjacent end sections 65 and 66 of flared end portions 52 and 53 respectively, while being labeled with central, internal sections 67 and 68. Upon inner tube 62, between end section 65 and central section 67, is mounted a first collar 70, Also upon inner tube 62, between central sections 67 and 68, is mounted a second collar 71. Finally, between end section 66 and central section 68 is mounted a third collar 72 upon inner tube 62. Each collar 70-72 has an outwardly exposed plate 76 that is secured through fasteners 78 and 79 to a blade support bar 81. Although blade support bar 81 could take various forms, the embodiment shown depicts blade support bar 81 as being generally L-shaped in side-view. In any case, extending along blade support bar 81 is an elongated blade element 83. More specifically, elongated blade element 83 has associated therewith a fastening plate 85 which, in the embodiment shown, includes first and second sections 87 and 88 that are secured with fasteners 89 to blade support bar 81. Elongated blade element 83 defines a sharp blade edge 91 employed in connection with cutting dough made in dough mixer 2 as will be described more fully below. In one form of the invention, blade element 83 is formed of stainless steel and can be readily detached from blade support bar 81 for sharpening of edge 91 or replacement thereof.

Figure 2:
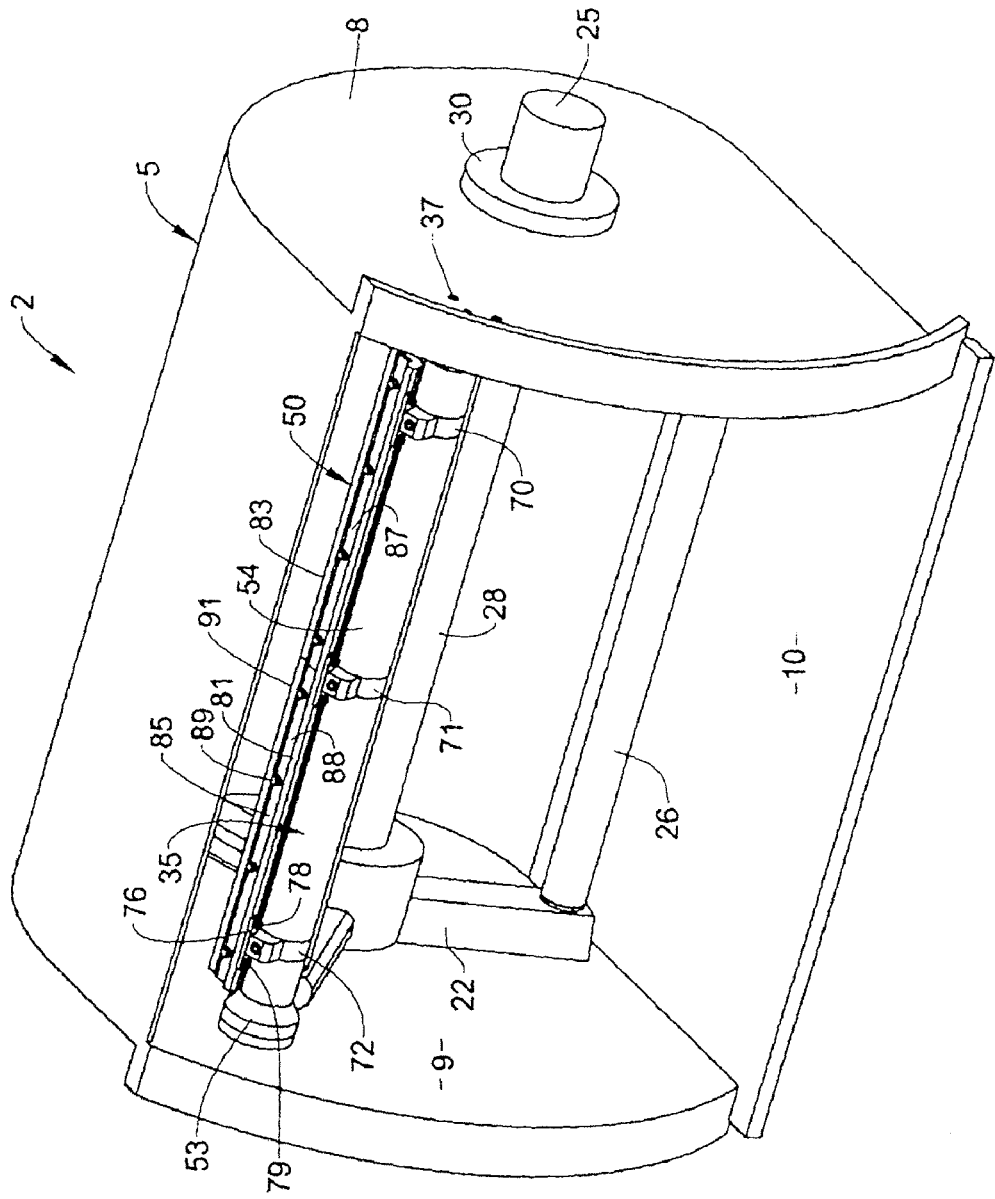
FIG. 2 is a perspective view of the dough mixer of FIG. 1 shown in a dough removal position, with the cutting mechanism in a non-cutting position.
Figure 3:
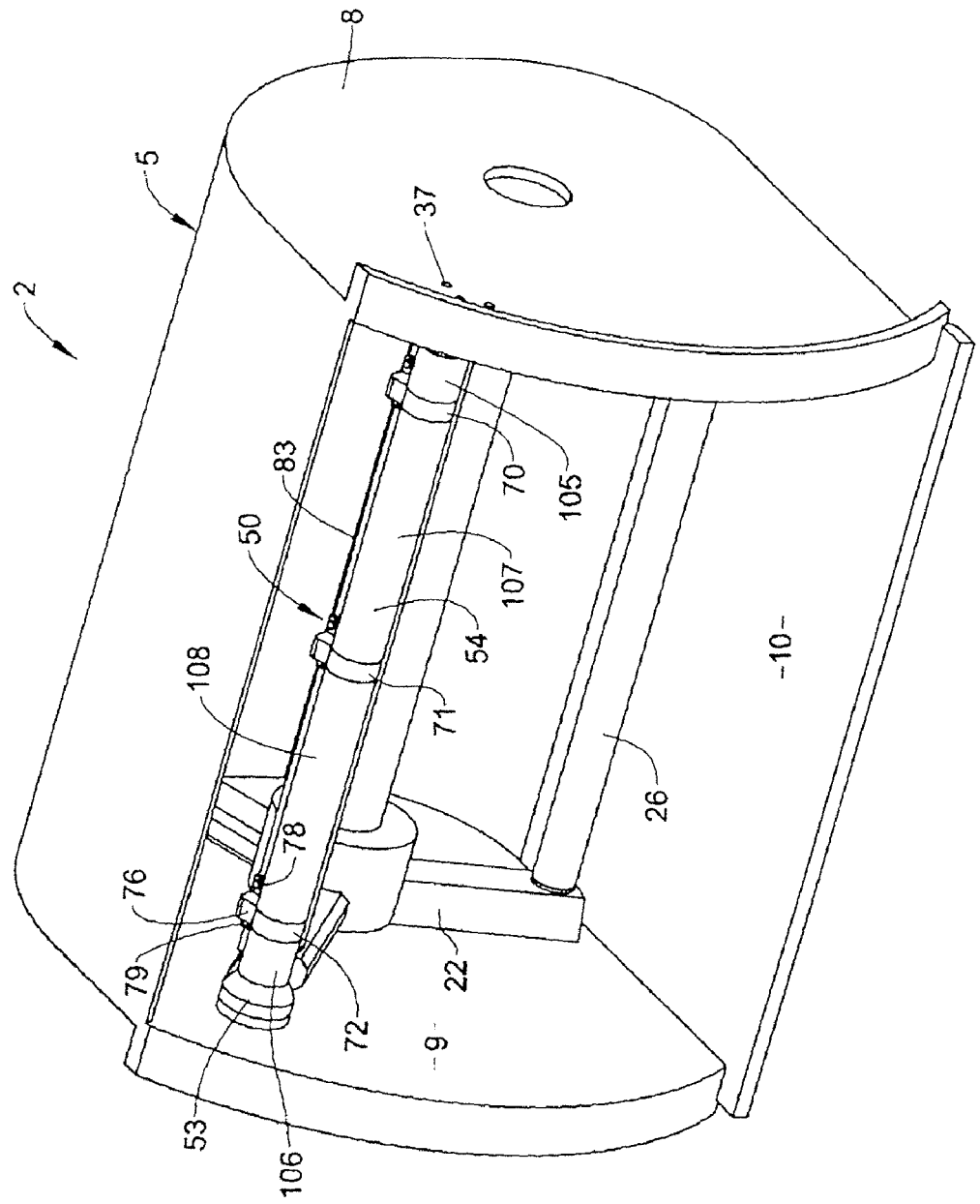
FIG. 3 is a perspective view of the dough mixer of FIG. 1 shown in a dough removal position, with the cutting mechanism in a cutting position.

In further accordance with the invention, blade element 83 is movable between a non-cutting position, shown in FIGS. 1 and 2, wherein elongated blade element 83 is located remote from mixing elements 26 so as to not interfere with mixing of the ingredients in internal mixing chamber 14, and a cutting position, shown in FIG. 3, wherein elongated blade 83 is arranged directly adjacent an operational path along which mixing elements 26 rotate within internal mixing chamber 14 in order to cut the mass of dough and assist in the discharge of the dough from tub 5 through opening 12. At this point, it should be noted that a wide range of actuators can be employed in connection with shifting blade element 83 between the non-cutting and cutting positions. However, reference will now be made to FIGS. 5 and 6 in describing an actuating arrangement for this embodiment of the invention.

Figure 5:
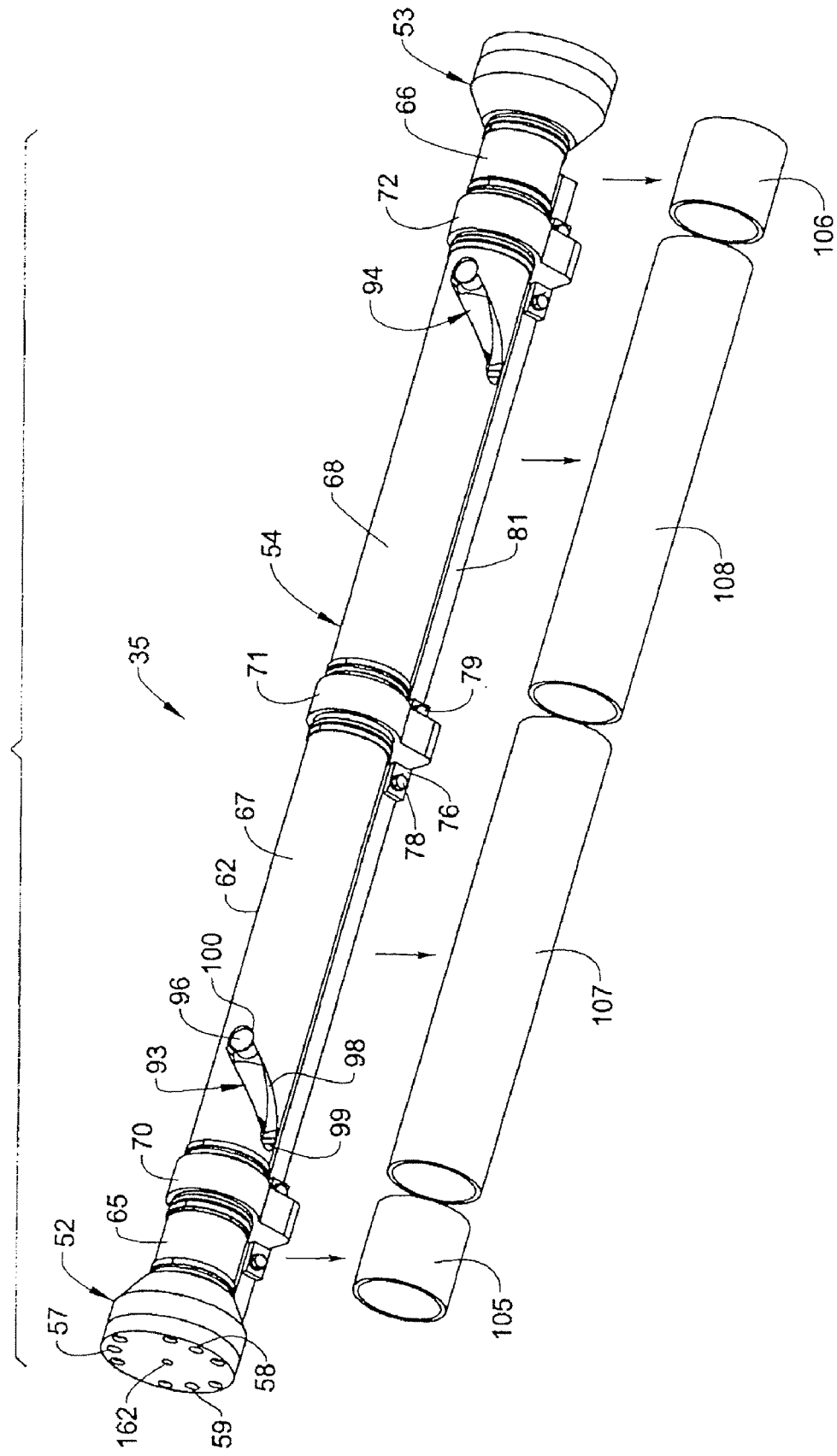
FIG. 5 is a partially exploded perspective view of the cutting mechanism of FIG. 4 in the cutting position.

In each of central sections 67 and 68, inner tube 62 is formed with a respective cam slot or track 93, 94. Extending into each cam track 93, 94 is a respective cam element 96 established by a cam follower with a crowned roller. As clearly shown in FIG. 5, each cam track 93, 94 includes a central slot portion 98 and terminal track lock portions 99 and 100. When breaker bar 35 is fully assembled, inner tube 62 is covered adjacent collars 70-72 with a pair of end sleeves 105 and 106, along with central sleeves 107 and 108. In FIG. 5, sleeves 105-108 are shown exploded from the remainder of breaker bar 35 in order to illustrate the overall camming arrangement described above.

Figure 6:
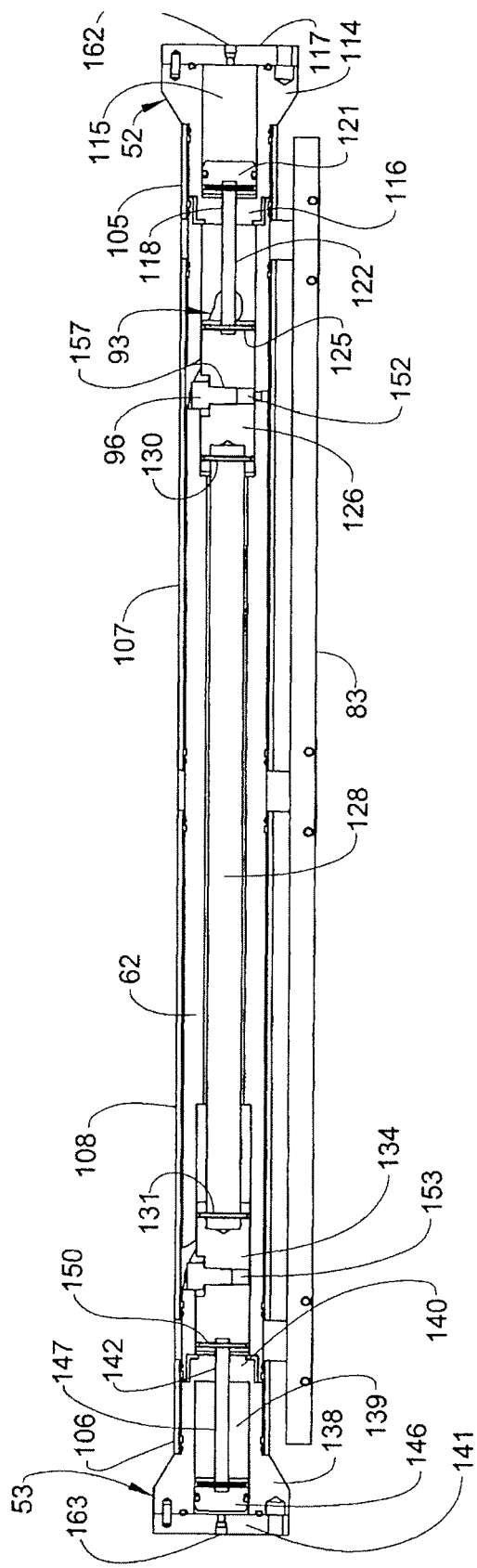
FIG. 6 is a cross-sectional view of the cutting mechanism of FIG. 4.
Figure 7:
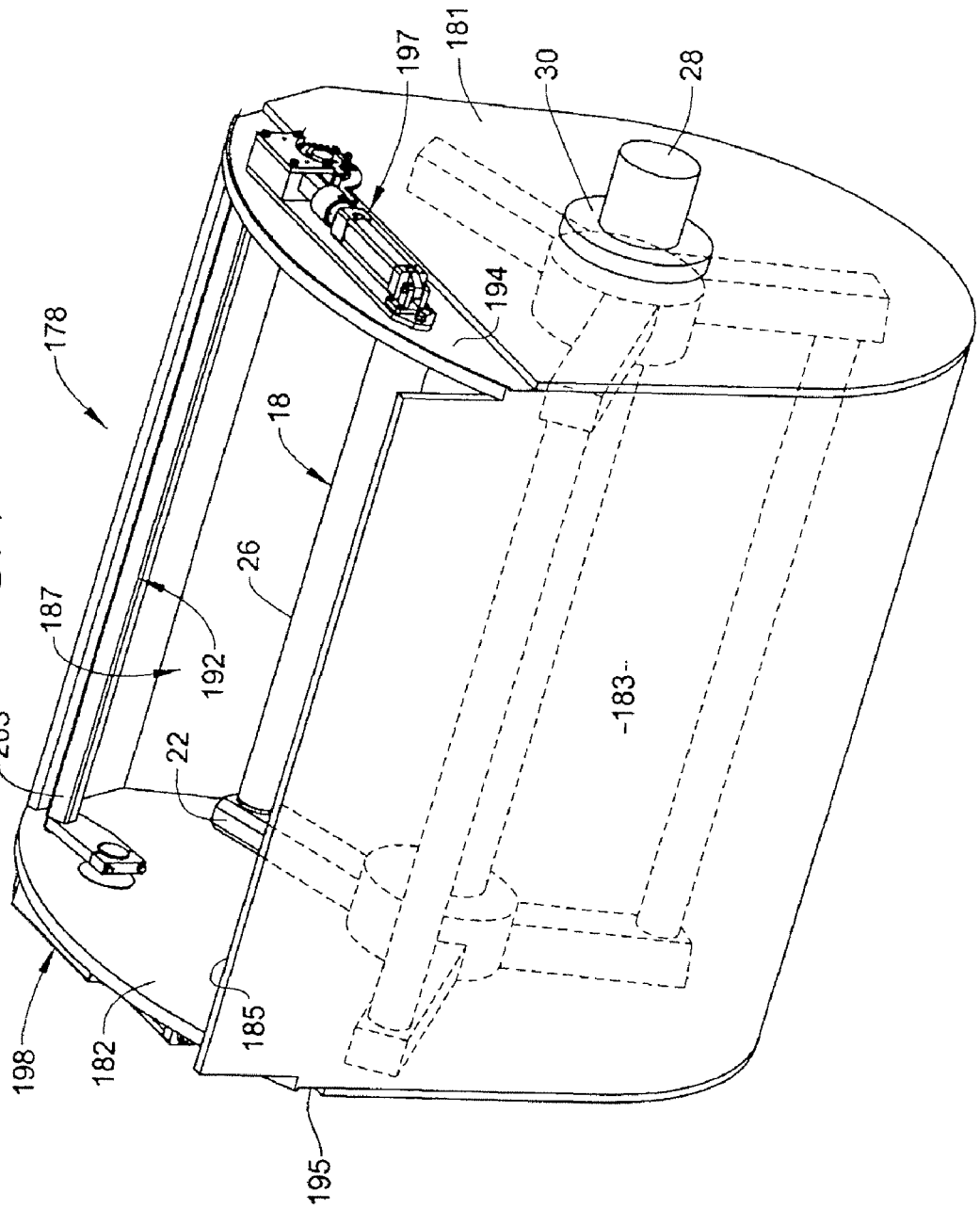
FIG. 7 is an enlarged perspective view of a horizontal dough mixer shown in a changing or mixing position and incorporating a cutting mechanism constructed in accordance with a second embodiment of the invention.

With particular reference to FIG. 6, flared end portion 52 is shown to include an outer body 114 that has formed therein an inner cylinder 115 defined, at least in part, by an inner terminal wall 116 and an end cap 117. Inner terminal wall 116 is formed with a non-circular, preferably rectangular, bore 118. Mounted within inner cylinder 115 is a piston head 121 to which is secured a piston shaft 122 which is non-circular in cross-section. Piston shaft 122 extends through bore 118 and is secured by a pin 125 to an actuator block 126. Due to the non-circular cross-sections employed, piston shaft 122 is keyed to inner terminal wall 116 and, correspondingly, end portion 52. A connecting rod 128 is slidably mounted within inner tube 62 and is secured to actuator block 126 by a pin 130. An opposing end of connecting rod 128 is secured by a pin 131 to another actuating block 134.

In a manner directly analogous to the structure described above in connection with flared end portion 52, flared end portion 53 of breaker bar 35 includes an outer body 138 within which is defined an inner cylinder 139 having an inner terminal wall 140. An end cap 141 is secured to outer body 138 to close off inner cylinder 139, while a non-circular, preferably rectangular, bore 142 is formed in inner terminal wall 140. A piston head 146 is arranged within inner cylinder 139 and has an associated piston shaft 147 that is non-circular in cross-section and projects through bore 142 and is secured through a pin 150 to actuator block 134.

Each actuator block 126, 134 is formed with a respective through hole 152, 153. Each cam element 96 extends into a corresponding cam track 93, 94 and is secured in a respective through hole 152, 153. In an embodiment, each cam element 96 includes a shaft portion 157 threadably mounted in the through hole 152, 153 and is covered by a respective central sleeve 107, 108. As also shown in FIGS. 5 and 6, end caps 117 and 141 are provided with ports 162 and 163 which enable the connection of fluid lines (not shown) to be attached to breaker bar 35.

With the above arrangement, actuating fluid, such as hydraulic, pneumatic or other fluid sources, can be selectively introduced or expelled from cylinders 115 and 139 in order to cause shifting of piston heads 121 and 146 relative to inner tube 62. In the position shown in FIG. 6, pressurized fluid has been introduced through port 162 into inner cylinder 115 in order to cause piston head 121 to shift to the left as viewed in this figure. At the same time, pressure is released within inner cylinder 139 to enable a corresponding shifting of piston head 146 within inner cylinder 139. Due to the attachments between piston shaft 122, actuator block 126, connecting rod 128, actuator block 134 and piston shaft 147, a concurrent linear shifting of these various elements will occur. Rotation of these components is not permitted during this shifting due to the pure sliding accommodated between piston shafts 122, 147 and bores 118, 142. With this shifting, cam elements 96 will be forced to shift within cam tracks 93 and 94. As inner tube 62 cannot shift laterally relative to flared end portions 52 and 53 of breaker bar 35, this interaction between cam elements 96 and cam tracks 93 and 94 will force inner tube 62, collars 70-72, blade support bar 81 and blade element 83 to rotate relative to flared end portions 52 and 53. In this fashion, the application or removal of pressure to inner cylinders 115 and 139 is used to shift elongated blade element 83 of cutting mechanism 50 between the non-cutting position shown in FIGS. 1 and 2 and the cutting position shown in FIG. 3. As shown in FIG. 5, camming elements 96 have reached one end of cam tracks 93 and 94 and have entered terminal track lock portions 100. As clearly illustrated in this figure, terminal track lock portions 99 and 100 are arranged slightly offset from the remainder of cam tracks 93 and 94 such that they basically establish ledges against which cam elements 96 become positioned. Terminal track lock portions 99 and 100 are provided in order to provide more positive terminal positions for cam elements 96 when blade element 83 assumes each of the cutting and non-cutting positions. When in the cutting position, cam elements 96 become registered in terminal track lock portions 100 whereupon inner tube 62 provides a surface against which reaction forces develop during operation of cutting mechanism 50 can be counteracted. This arrangement advantageously enables a significantly reduced pressure to be applied to inner cylinders 115 and/or 139 to maintain blade element 83 in a desired position.

In the non-cutting position, as indicated above, blade element 83 is sufficiently spaced from mixing elements 26 of agitator assembly 18 so as to not interfere with the mixing operation. However, when cutting mechanism 50 is placed in the cutting position, blade element 83 is arranged juxtaposed an operational path for the mixing elements 26. In particular, blade element 83 is positioned directly adjacent the operational path such that mixing elements 26 do not abut blade element 83 upon rotation of agitator assembly 18. Instead, a clearance 145 (see FIG. 4) is established between mixing elements 26 and blade element 83. In general, clearance 145 can range between just slightly greater than zero to about 1 inch (2.54 cm), with the gap varying based on numerous parameters, particularly the actual mix and mixer geometries. In certain forms of the invention, clearance 145 is under ¼ inch (approximately 0.6 cm). With this arrangement, any dough carried by the individual mixing elements 26 will be caused to pass blade element 83 whereupon the dough will be sliced by blade element 83. Given the substantially downward arrangement of opening 12 during the discharge operation, the automatic cutting of the dough upon rotation of agitator assembly 18 greatly enhances the ability of the dough to readily fall from within tub 5. In accordance with an embodiment of an operational mode of the invention, either directly following or concurrent with the rotation of tub 5 to the discharge position of FIGS. 2 and 3, cutting mechanism 50 is actuated to shift blade element 83 to the cutting position. Thereafter, agitator assembly 18 is slowly rotated, preferably between 360° and 720° in a single direction, to deliver dough extending across mixing elements 26 to blade element 83 such that the desired cutting operation can be performed and the enhanced discharge of the dough from tub 5 is achieved. If desired, the dough within tub 5 can also be sprayed with oil to further enhance the extraction process.

FIGS. 7-10 will now be referenced in describing a further embodiment of the dough extraction system of the invention. The embodiment of FIGS. 7-10 illustrates a mixing bowl or tub 178 for a horizontal dough mixer, with tub 178 including first and second end walls 181 and 182 interconnected by a side wall 183. Tub 178 includes an associated opening 185 leading to an internal mixing chamber 187. In general, the main structure and operation of the dough mixer of this embodiment directly corresponds to that described above with respect to dough mixer 2. Therefore, this general description will not be reiterated here. In connection with its structure and operation, the same agitator assembly 18 and drive arrangement described above is employed. In general, this embodiment differs from that described above with respect to the structure and operation of its associated cutting mechanism which is generally indicated at 192. Given the actuator structure of cutting mechanism 192, tub 178 is shown to include wall sections 194 and 195 on first and second end walls 181 and 182 respectively, with end walls 181 and 182 actually forming part of an overall cooling jacket. At each of wall sections 194 and 195 is mounted an associated actuator 197, 198 for cutting mechanism 192. Prior to describing particulars of actuators 197 and 198, other details of cutting mechanism 192 will now be described.

Figure 8:
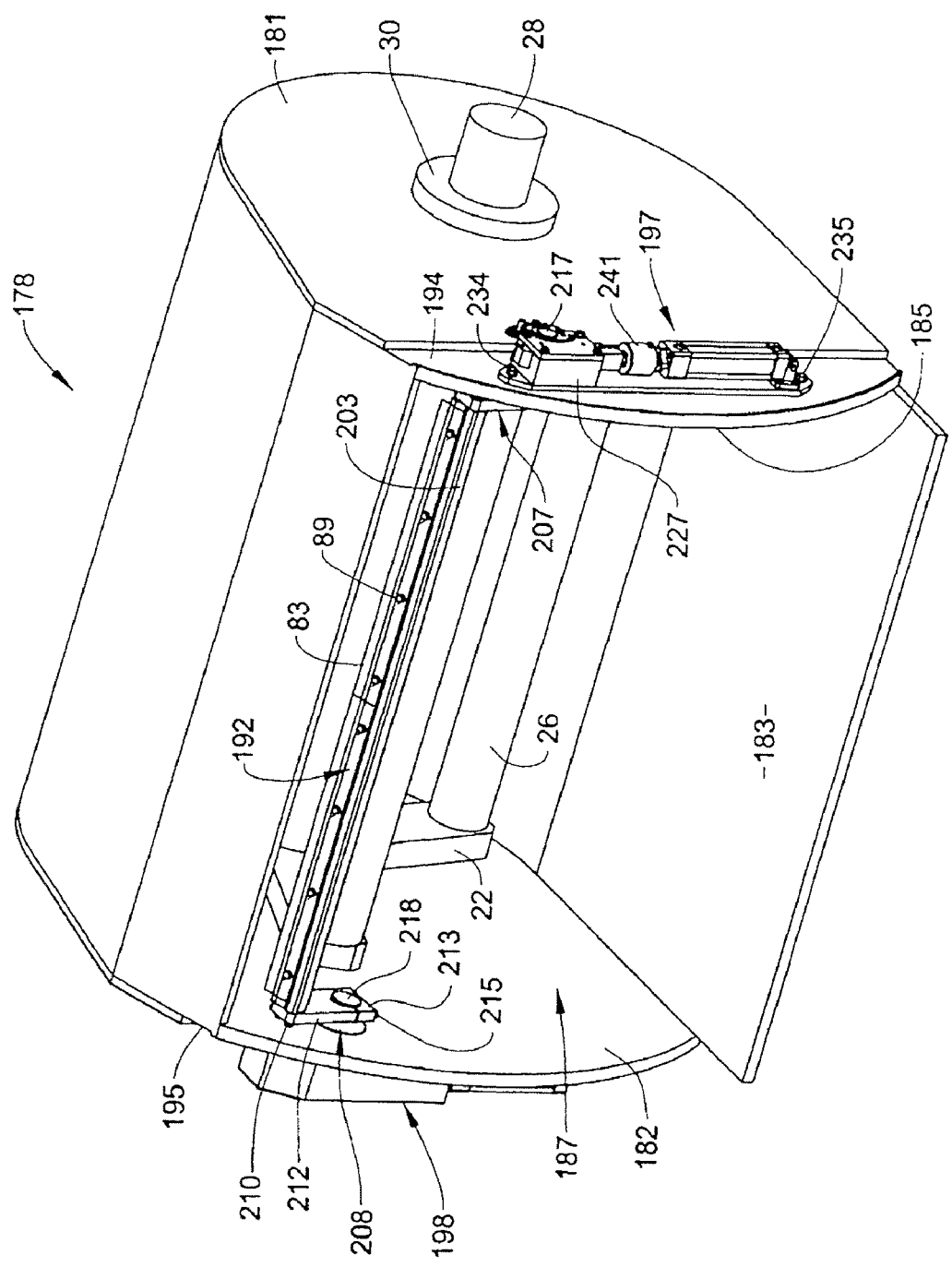
FIG. 8 is a perspective view of the dough mixer of FIG. 7 shown in a dough removal position, with the cutting mechanism in a non-cutting position.
Figure 9:
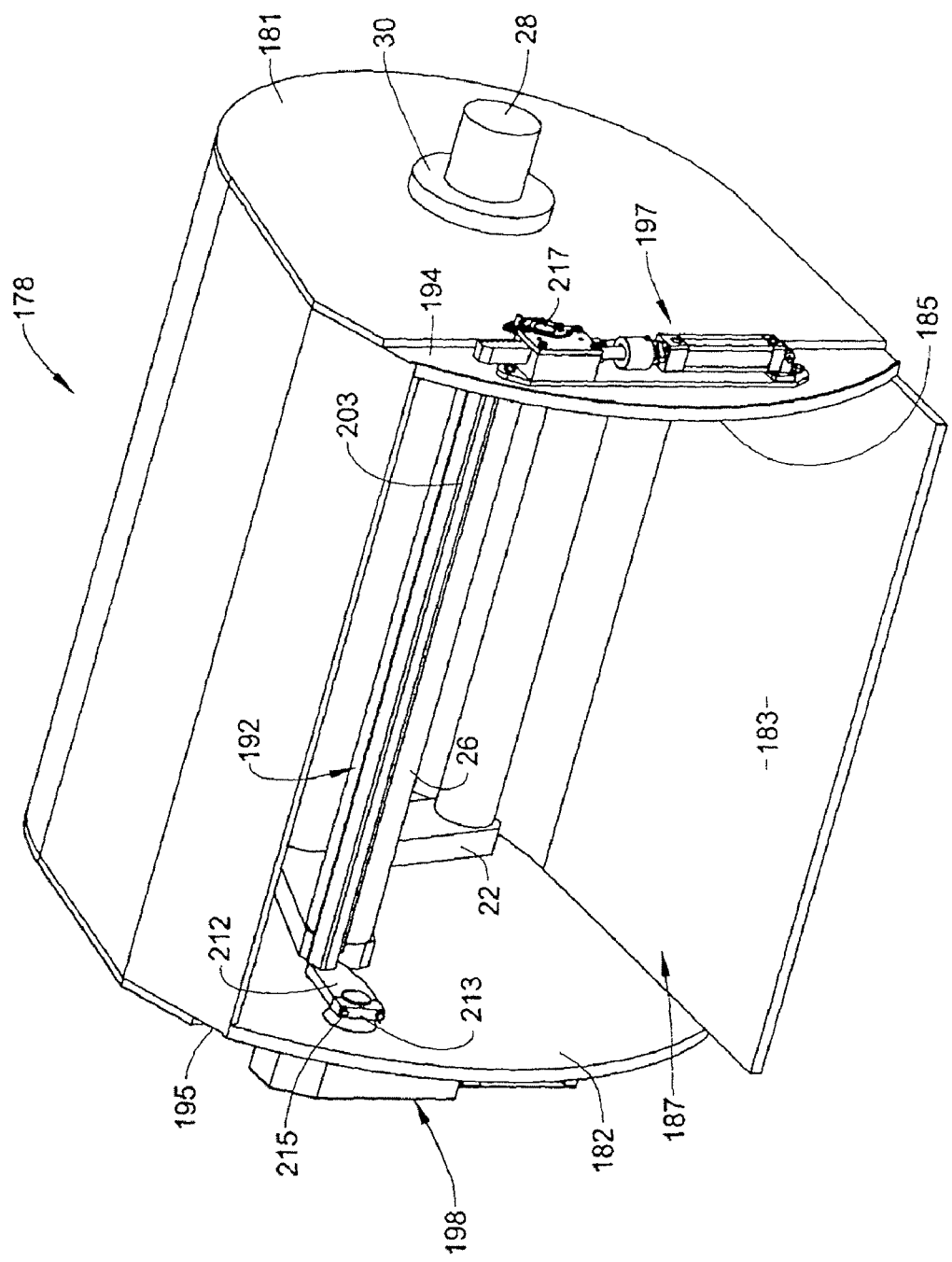
FIG. 9 is a perspective view of the dough mixer of FIG. 7 shown in a dough removal position, with the cutting mechanism in a cutting position.
Figure 10:
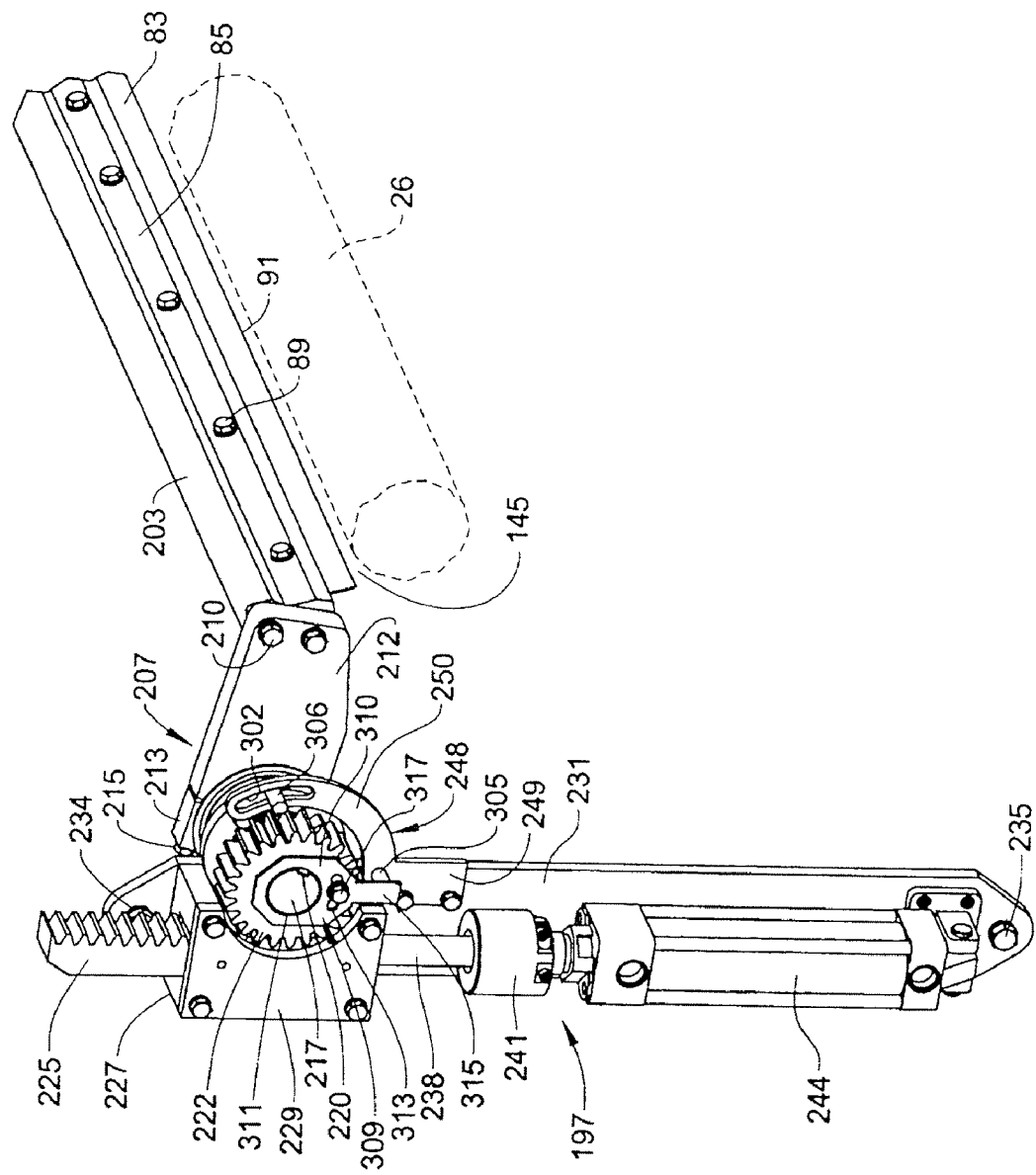
FIG. 10 is a partial perspective view of the cutting mechanism shown in FIGS. 7-9.

As perhaps best shown in FIGS. 8 and 10, cutting mechanism 192 includes a blade support bar 203 to which elongated blade element 83 and fastening plate 85 are secured by fasteners 89. In this embodiment, blade support bar 203 is secured between a pair of split end plates 207 and 208 by means of threaded fasteners 210. Each end plate 207, 208 is similarly constructed to include a first portion 212 and a second portion 213 which are interconnected by fasteners 215 in a manner which clamps spilt end plates 207 and 208 to respective rotatable drive shafts 217 and 218.

As the structure and operation of actuators 197 and 198 provided on first and second end walls 181 and 182 are identical, particular reference will now be made to FIG. 10 in describing in detail actuator 197 on first end wall 181 and it is to be understood that actuator 198 on second end wall 182 is structured and operates in a corresponding manner. As clearly shown in this figure, rotatable shaft 217 projects away from split end plate 207 and, through a key 220, is rotatably mated with a pinion or driven gear 222. Pinion gear 222 meshes with a rack gear 225 which is longitudinally shiftable within a housing 227, while being prevented from lateral displacement due to the presence of a cover plate 229. Housing 227 is formed with or attached to a mounting plate 231 which, in turn, is fixed to wall section 194 of first end wall 181 through fasteners 234 and 235. Extending from rack gear 225 is a shaft 238 which projects through a clamp stop 241 and is linked to a linear actuator 244. In accordance with the invention, linear actuator 244 can take various forms, including a solenoid and a fluid actuator.

In operation, movement of linear actuator 244 causes shaft 238 and rack gear 225 to shift longitudinally relative to mounting plate 231 and housing 227. In the position shown in FIG. 10, rack gear 225 is fully extended and cutting mechanism 192 is in a cutting position wherein elongated blade element 83 is arranged directly adjacent the operational path of mixing elements 26. When rack gear 225 is shifted downward from the position shown in FIG. 10, clamp stop 241 acts to limit the permissible extent of travel, which is represented at a point at which rack gear 225 abuts clamp stop 241. Upon movement of rack gear 225, the interengagement with pinion gear 222 will cause rotation of shaft 217 and a corresponding pivoting or rotation of split end plate 207. This movement of split end plate 207 will cause elongated blade element 83 to shift to the non-cutting position shown in FIG. 8 wherein blade element 83 assumes an unobstructing position in a manner directly analogous to that described above with respect to the first embodiment of the invention.

In further accordance with this embodiment of the invention, structure is provided to sense the travel of pinion gear 222 and, correspondingly, the movement of blade element 83 between the non-cutting and cutting positions. For this purpose, as also clearly shown in FIG. 10, a plate 248 includes a mounting portion 249 and a cantilevered portion 250. Mounting portion 249 is fixed to mounting plate 231 through the use of fasteners (not labeled), while cantilevered portion 250 is formed with an arcuate slot 302. First and second fixed proximity switches 305 and 306 are provided at representative end points for the movement of blade element 83. More specifically, proximity switch 305 extends from mounting portion 249, while proximity switch 306 projects through arcuate slot 302. At this point, it should be recognized that proximity switches 305 and 306 do not rotate with pinion gear 222 or shift with split end plate 207. Instead, a sensor plate 309 is mounted for rotation with pinion gear 222 and cooperates with proximity switches 305 and 306. As shown, sensor plate 309 includes a main body 310 provided with a central opening 311 that extends about rotatable shaft 217. In addition, main body 310 includes an arcuate slot 313 and a projecting tab 315. A fastener 317 extends through arcuate slot 313 in order to fix sensor plate 309 to pinion gear 222 for co-rotation. When blade element 83 is in the cutting position shown in FIG. 10, projecting tab 315 is arranged directly adjacent proximity switch 305 and provides a signal through wiring (not shown) to a controller (also not shown) to relay the position of blade element 83. Upon downward shifting of rack gear 225, sensor plate 309 will rotate in unison with pinion gear 222. When blade element 83 reaches its non-cutting position, projecting tab 315 is arranged directly adjacent proximity switch 306 for signaling purposes. In this manner, the operation of cutting mechanism 192 can be electronically monitored.

Figure 11:
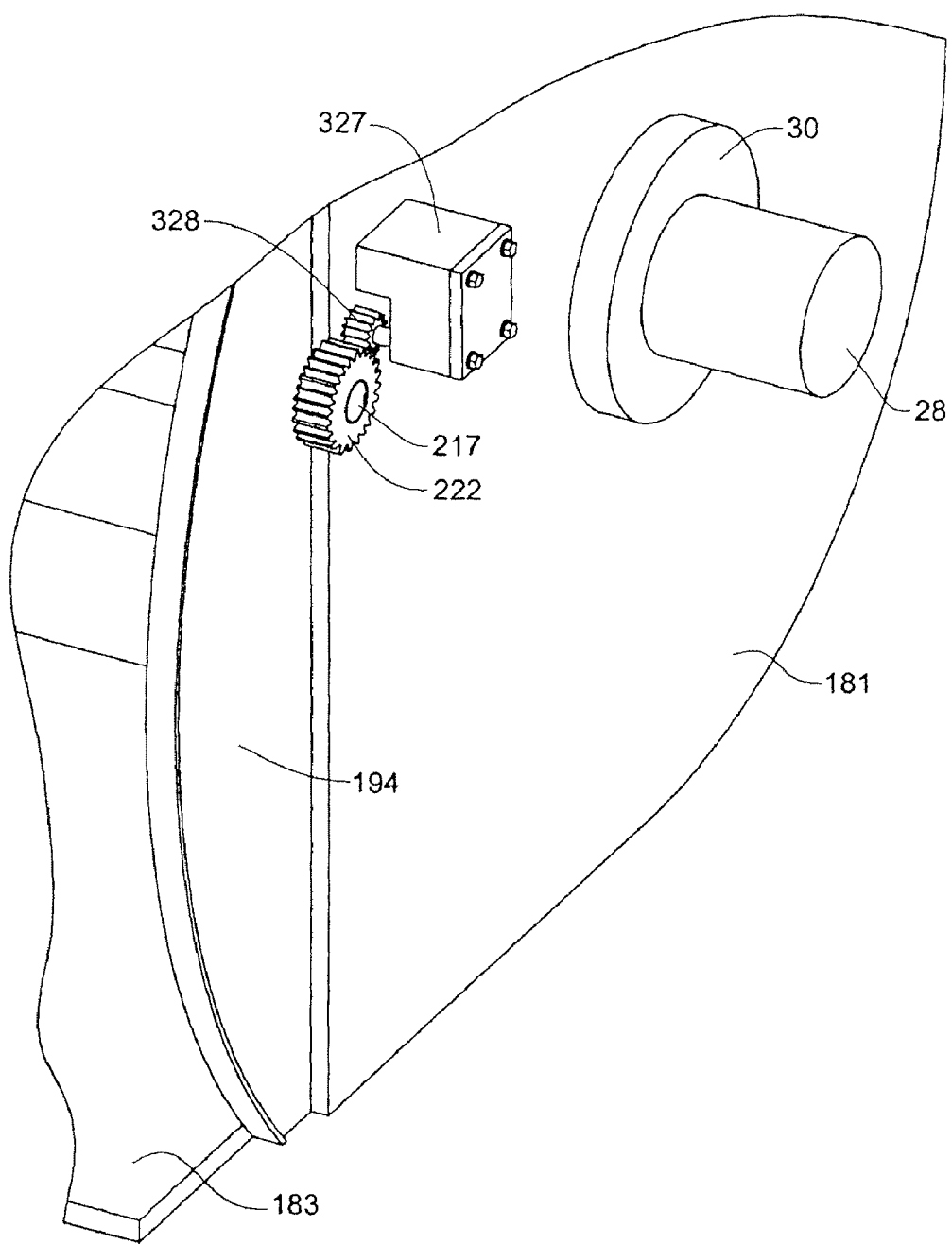
FIG. 11 is a perspective view of a dough mixer incorporating a cutting mechanism constructed in accordance with a third embodiment of the invention.
Figure 12:
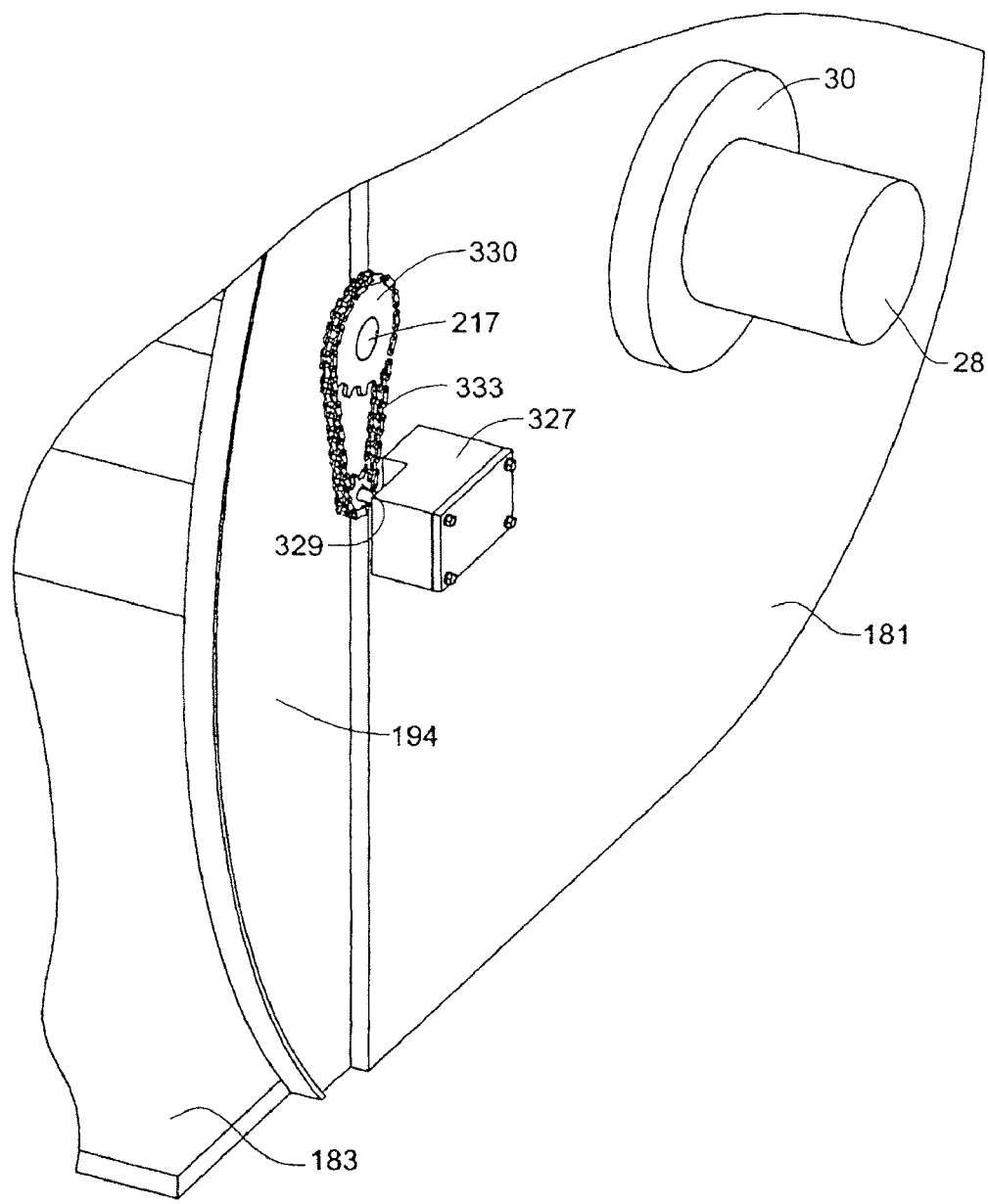
FIG. 12 is a perspective view of a dough mixer incorporating a cutting mechanism constructed in accordance with a fourth embodiment of the invention.
Figure 13:
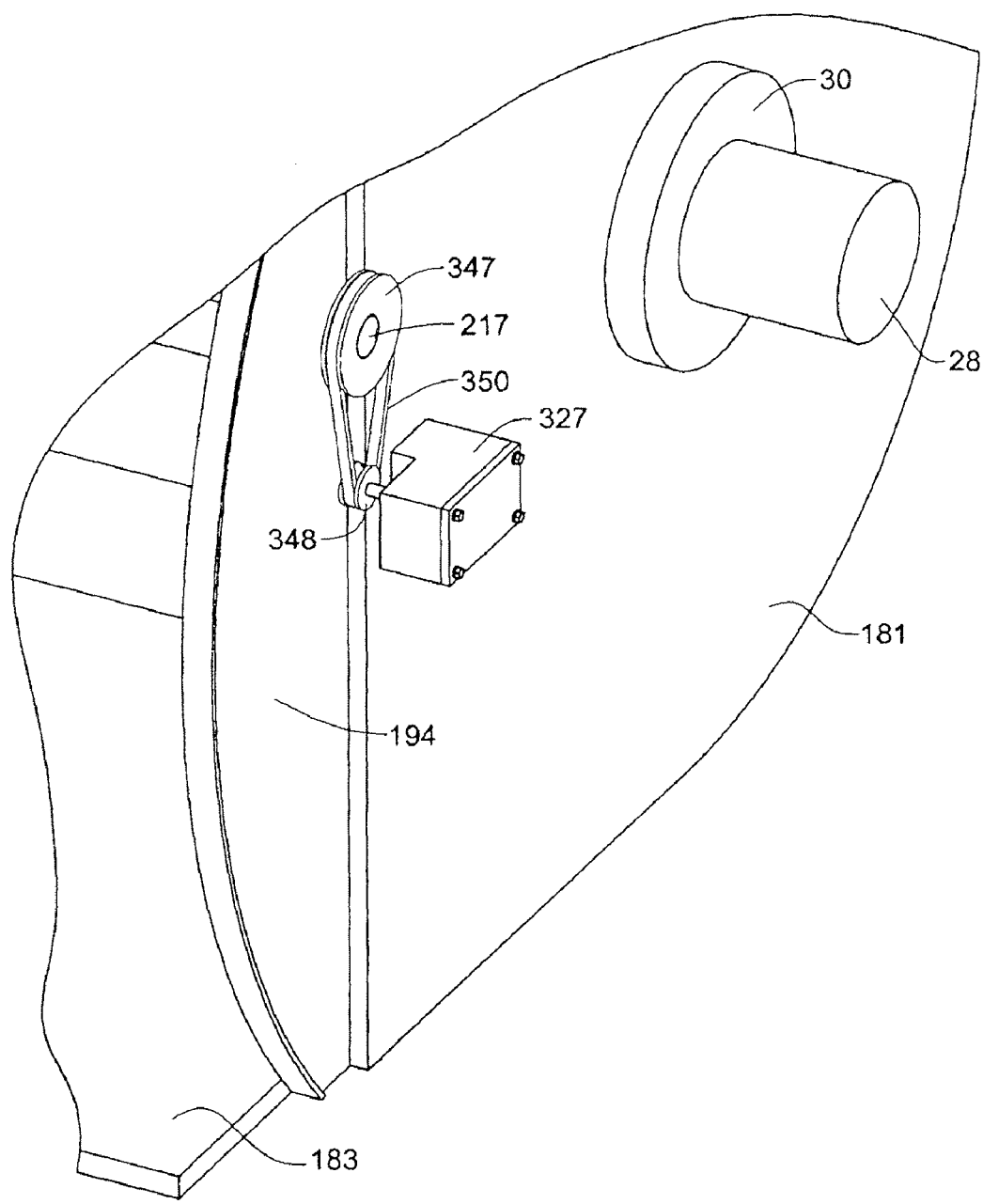
FIG. 13 is a perspective view of a dough mixer incorporating a cutting mechanism constructed in accordance with a fifth embodiment of the invention.

At this point, it should be readily apparent that actuators 197 and 198 operate in unison for the synchronous movement of blade element 83. Although actuators 197 and 198 are shown to constitute linear actuators, it should be recognized that various other types of actuator arrangements could be employed to perform a corresponding function of shifting blade element 83 between the non-cutting and cutting positions. FIG. 11 shows a modified version of the embodiment of FIGS. 7-10 wherein the linear actuators 197 and 198 are replaced by a gear drive system. In accordance with this embodiment, pinion or driven gear 222 is adapted to be driven by a bi-directional motor 327 having an associated drive gear 328. With this arrangement, motor 327 can be operated to rotate pinion gear 222 through drive gear 328 such that blade element 83 is shifted between the non-cutting and cutting positions. In FIG. 12, another potential drive arrangement is illustrated wherein motor 327 includes a drive gear 329 which is spaced from a driven or pinion gear 330, while drive gear 329 and driven gear 330 are interconnected through a chain 333. In a further exemplary embodiment shown in FIG. 13, rotatable shaft 217 has fitted thereto a pulley 347 and motor 327 has fitted thereto a pulley 348. A belt 350 extends between and drivingly interconnects motor 327 with rotatable shaft 217. Again, it should be readily apparent that various different types of mechanical drive assemblies can be employed in connection with the invention and the embodiments described are merely exemplary and not exhaustive of the different types of drive arrangements which could be employed. With these embodiments, wall sections 194 and 195 are preferably employed, mainly to accommodate clearances between tub 178 and the surrounding jacket (not shown).

Figure 14:
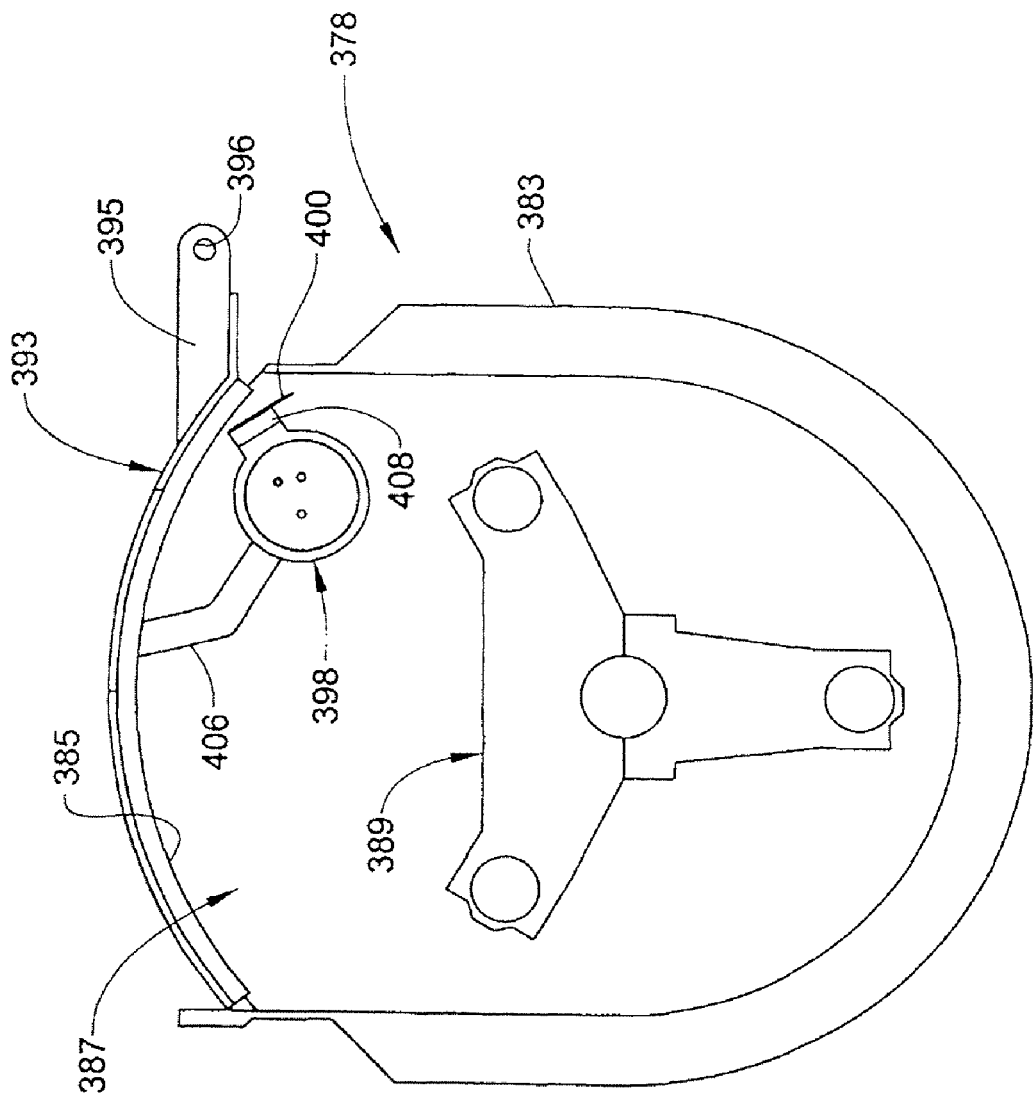
FIG. 14 is a cross-sectional side view of a dough mixer shown in a charging or mixing position and depicting a cutting mechanism constructed in accordance with a sixth embodiment of the invention.
Figure 15:
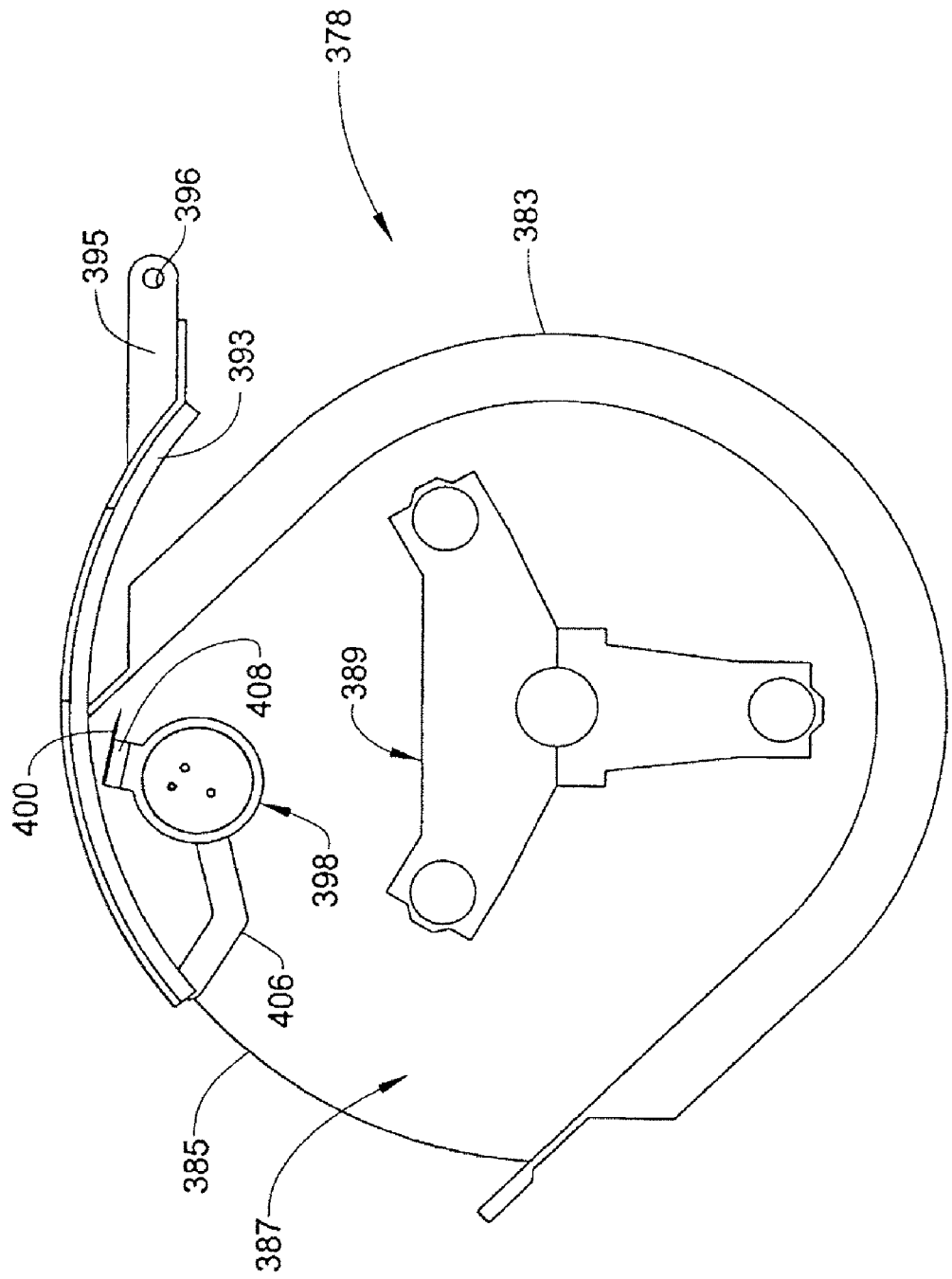
FIG. 15 is a cross-sectional side view of the dough mixer of FIG. 14 with a tub of the dough mixer being partially shifted towards a dough discharge position.
Figure 16:
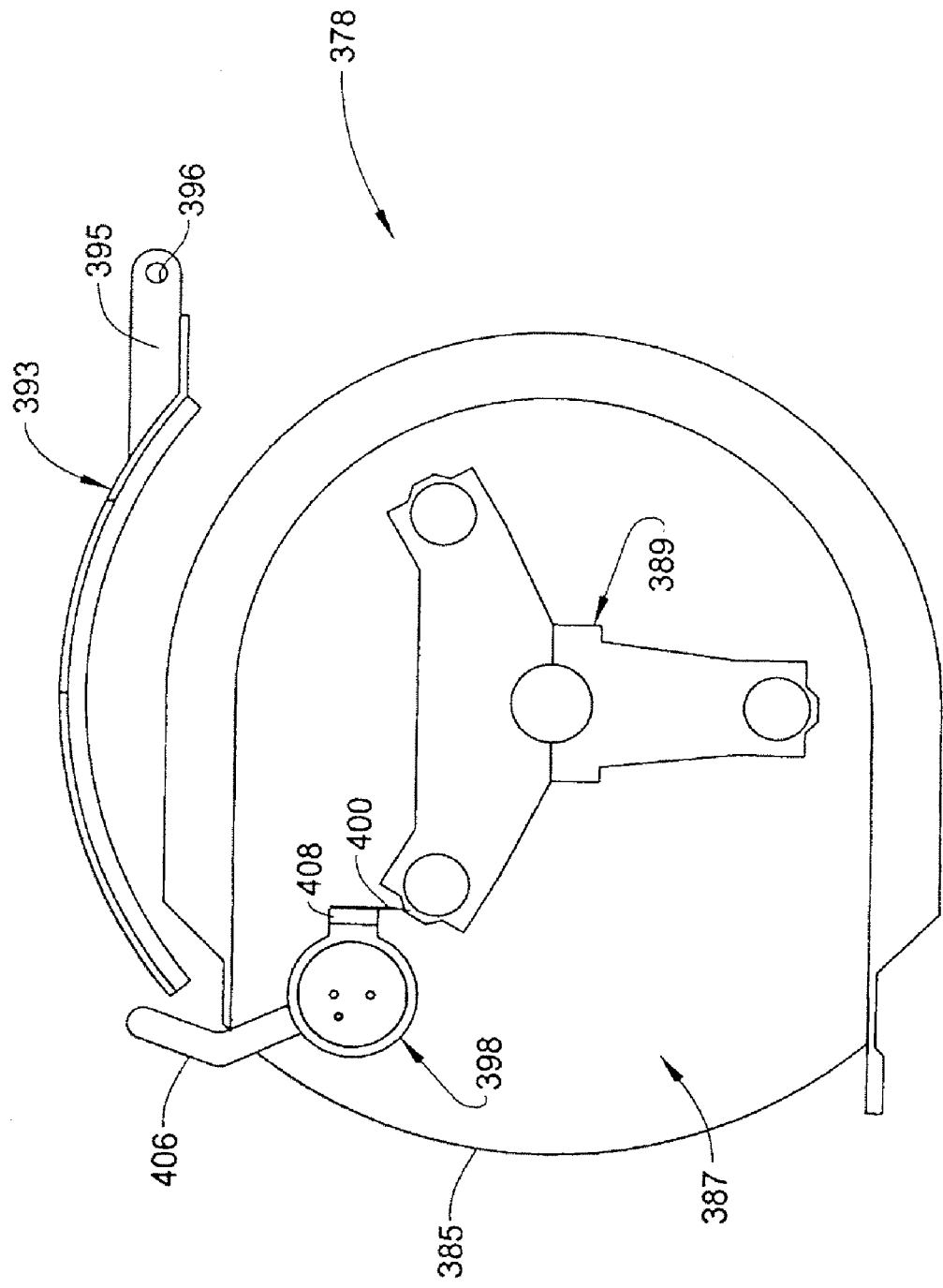
FIG. 16 is a cross-sectional side view of the dough mixer of FIG. 14 shown with the mixer in the dough discharge position and the cutting mechanism in a cutting position.
Figure 17:
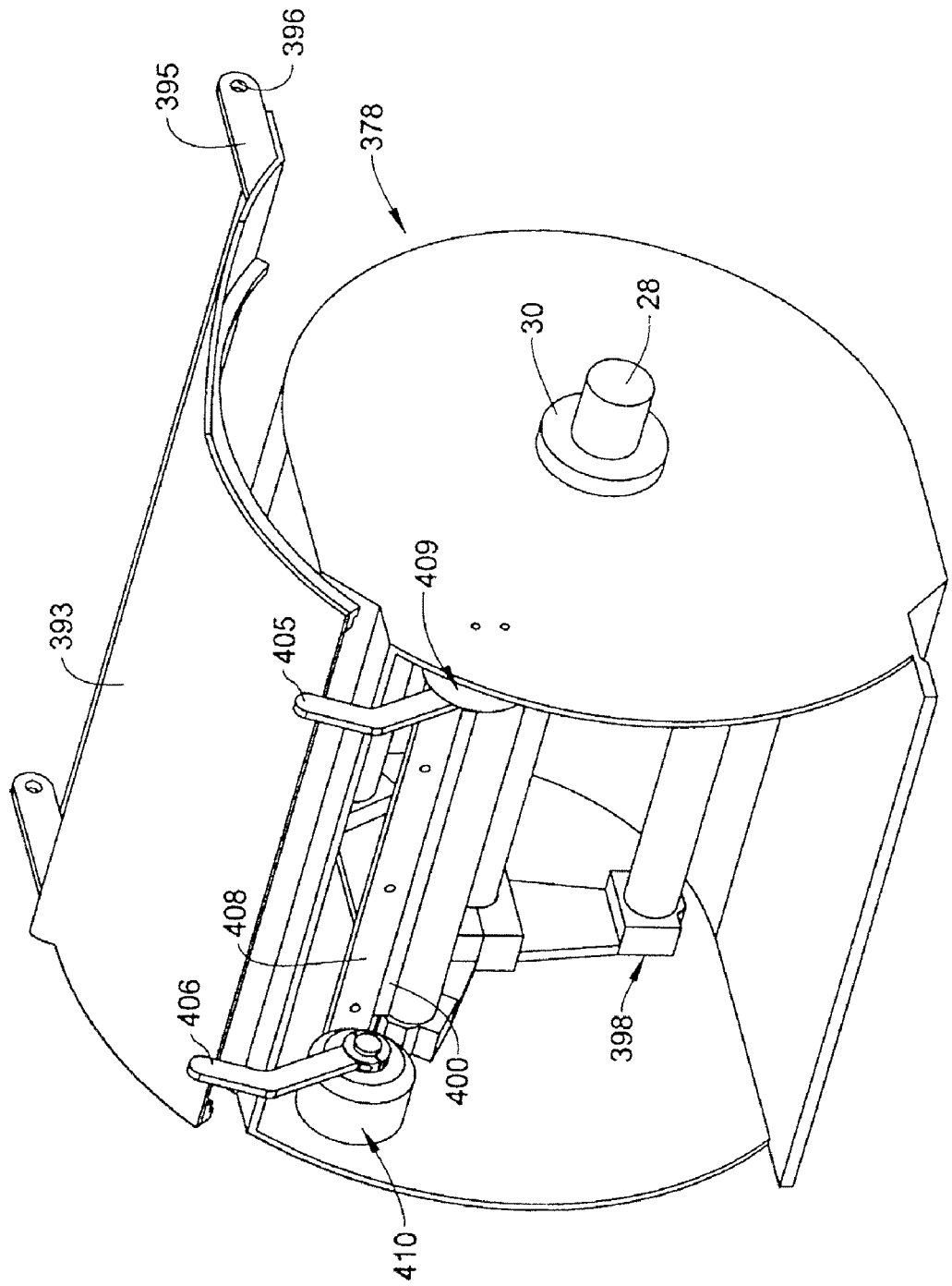
FIG. 17 is a perspective view of the dough mixer of FIGS. 14-16 with the cutting mechanism shown in a cutting position.
Figure 18:
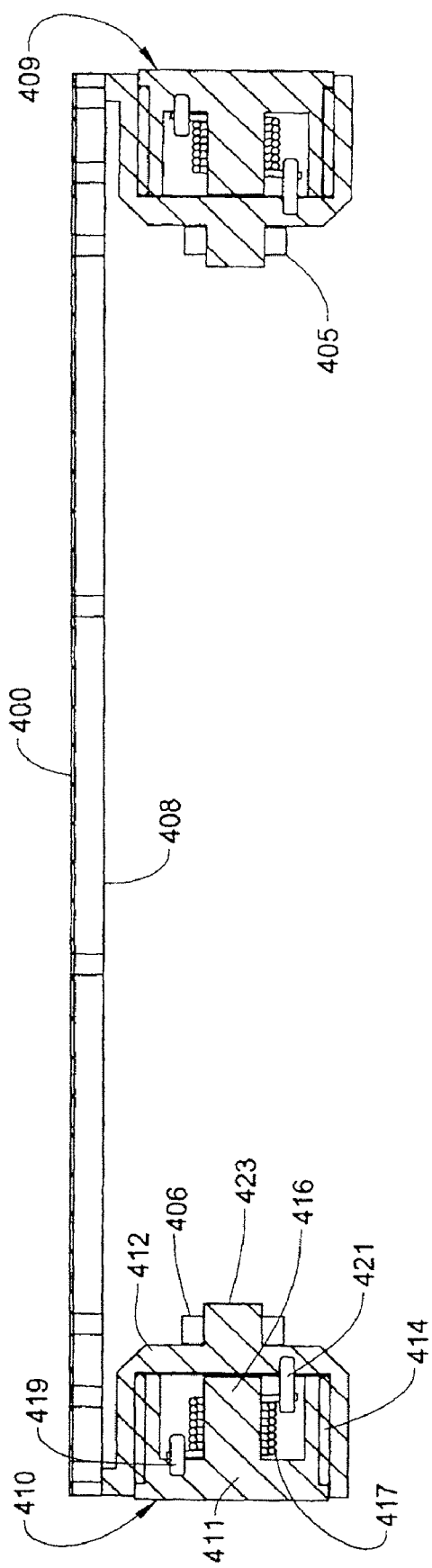
FIG. 18 is a cross-sectional view of the cutting mechanism of FIGS. 14-17.

Finally, reference is made to FIGS. 14-18 which illustrate a still further embodiment of the invention. More particularly, FIGS. 14-16 show a cross-section of a mixing bowl or tub 378 having a side wall 383 and an opening 385 that leads to an internal mixing chamber 387. Mounted for rotation within internal mixing chamber 387 is an agitator assembly 389 including various mixing elements (not labeled) directly corresponding to that described above. The only significant difference in accordance with the embodiment of this invention is that tub 378 is shown to be provided with a cover member 393 that is adapted to extend over opening 385 when agitator assembly 389 is performing a mixing or kneading operation, wherein a corresponding cover member was not shown in the other embodiments for the sake of clarity of the drawings. As depicted, cover member 393 is provided with arms, one of which is indicated at 395. Each arm 395 is provided with an opening 396 which is adapted to receive a shaft or pin for enabling cover member 393 to pivot for exposing opening 385 in order to charge internal mixing chamber 387. Instead of pivoting, cover member 393 could be provided with a hole or a separate hatch to permit charging. In this embodiment, similar to the embodiment described above with reference to FIGS. 1-6, tub 378 is provided with a breaker bar 398. In essence, the embodiment of FIGS. 14-18 represents a modified form of the embodiment set forth in FIGS. 1-6 in connection with the manner in which an elongated blade element 400 is shifted between the non-cutting position of FIGS. 14 and 15 to the cutting position of FIGS. 16 and 17. In accordance with this embodiment, a pair of angled lever arms 405 and 406 are attached for rotation with a blade support bar 408. In particular, mounted to side walls 383 and 384 are hub assemblies 409 and 410 respectively. As best shown in FIG. 18, each hub assembly 409, 410 includes a stationary hub member 411 which is fixedly mounted to a respective side wall 383, 384, and a rotating hub member 412. Interposed between stationary hub member 411 and rotating hub member 412 is an annular bushing 414. Stationary hub member 411 includes a central shaft portion 416 about which is arranged a torsion spring 417. One end of torsion spring 417 abuts a pin 419 extending from stationary hub member 411 and another end of torsion spring 417 abuts a pin 421 extending from rotating hub member 412. Projecting from rotating hub member 412, at a position axially aligned with central shaft portion 416, is a stub shaft 423 to which a respective lever arm 405, 406 is clamped for co-rotation.

In accordance with this embodiment, torsion spring 417 provided in connection with each hub assembly 409, 410 biases blade element 400 to the cutting position. However, lever arms 405 and 406 are only permitted to shift to the cutting position shown in FIGS. 16 and 17 upon rotation of tub 378 from the charging and mixing position shown in FIG. 14, through the intermediate position shown in FIG. 15. That is, in each of the positions shown in FIGS. 14 and 15, terminal ends (not separately labeled) of lever arms 405 and 406 abut cover member 393, thereby preventing blade element 400 from shifting to the cutting position. However, once tub 378 reaches the discharging position wherein opening 385 fully exposes internal mixing chamber 387 such that the dough formed therein will have a tendency to fall out under the force of gravity, blade element 400 will be automatically shifted to the cutting position and agitator assembly 389 will be rotated to aid in the extraction of the dough in the manner fully described above. For this purpose, cover member 393 could be provided with tracks (not shown) for guiding lever arms 405 and 406.

Based on the above, it should be readily apparent that the invention sets forth various ways in which an automatic cutting mechanism can be mounted for movement relative to a tub of a dough mixing apparatus and utilized to shift an elongated blade element between a non-cutting position, wherein the elongated blade element is located remote from a plurality of mixing elements so as to not interfere with mixing of ingredients in an internal mixing chamber of the tub, and a cutting position, wherein the elongated blade element is arranged directly adjacent an operational path of the mixing elements for cutting of the mass of dough and assisting in the discharge of the dough from the internal mixing chamber. The cutting mechanism can be provided while manufacturing the dough mixing apparatus or as a retrofit to an existing unit. Even though certain preferred embodiments have the cutting mechanism mounted to the tub, it is possible to employ an automated, externally mounted cutting mechanism that shifts relative to the tub between the cutting and non-cutting positions to perform a corresponding function. In any case, although described with reference to various embodiments of the invention, it should be readily understood that various changes and/or modifications can be made to the invention without departing from the spirit thereof. For instance, although the invention is particularly adapted for use in connection with automatically extracting dough from a horizontal mixer, it should be understood that the invention can be used outside this application. In general, the invention is only intended to be limited by the scope of the following claims.

What is claimed is:

1. A dough mixing apparatus comprising:
a tub having first and second end walls interconnected with at least one side wall which collectively define an internal mixing chamber adapted to be charged with ingredients for making dough, said tub being provided with an opening for discharging dough formed in the internal mixing chamber;
a plurality of mixing elements mounted for rotation about an axis within the internal mixing chamber along an operational path for mixing the ingredients into a mass of dough; and
a cutting mechanism mounted for movement relative to the tub, said cutting mechanism including an elongated blade element movable between a non-cutting position, wherein the elongated blade element is located remote from the plurality of mixing elements so as to not interfere with mixing of the ingredients in the internal mixing chamber, and a cutting position, wherein the elongated blade element is arranged directly adjacent the operational path and within the mixing chamber, closer to the axis of the plurality of mixing elements than when in the non-cutting position, for cutting of the mass of dough and assisting in the discharge of the dough from the internal mixing chamber through the opening.

2. The dough mixing apparatus according to claim 1, wherein said tub is rotatably mounted for movement between a mixing position, wherein the opening exposes the internal mixing chamber upwardly, and a discharging position, wherein the opening exposes the internal mixing chamber more downwardly.

3. The dough mixing apparatus according to claim 1, wherein the cutting mechanism further includes an actuator for shifting the elongated blade element between the non-cutting and cutting positions.

4. The dough mixing apparatus according to claim 3, wherein the actuator constitutes a linear actuator.

5. The dough mixing apparatus according to claim 4, wherein the linear actuator includes a piston and cylinder assembly.

6. The dough mixing apparatus according to claim 5, further comprising: a breaker bar extending between the first and second end walls within the internal mixing chamber, said elongated blade element being rotatably supported by the breaker bar for movement between the non-cutting and cutting positions.

7. The dough mixing apparatus according to claim 6, wherein the linear actuator is integrated into the breaker bar.

8. The dough mixing apparatus according to claim 7, further comprising: at least one cam track and at least one cam element provided on the breaker bar, said at least one cam element projecting into the at least one cam track, wherein the elongated blade element is forcibly shifted between the non-cutting and cutting positions upon relative shifting between the at least one cam track and the at least one cam element.

9. The dough mixing apparatus according to claim 8, wherein the at least one cam track includes a terminal track lock portion, said at least one cam element extending into the terminal track lock portion when the elongated blade element is in the cutting position.

10. The dough mixing apparatus according to claim 4, wherein the linear actuator includes a rack gear.

11. The dough mixing apparatus according to claim 10, wherein the actuator includes a pinion gear fixed for co-rotation with the elongated blade element, said rack gear being interengaged with the pinion gear such that linear shifting of the rack gear causes the pinion gear to rotate and the elongated blade element to move between the non-cutting and cutting positions.

12. The dough mixing apparatus according to claim 3, wherein the actuator includes a drive member drivingly connected to a driven member which, in turn, is drivingly connected to the elongated blade element.

13. The dough mixing apparatus according to claim 12, wherein the drive and driven members are directly interengaged.

14. The dough mixing apparatus according to claim 13, wherein each of the drive and driven members constitutes a gear.

15. The dough mixing apparatus according to claim 12, wherein the drive and driven members are interconnected by a chain.

16. The dough mixing apparatus according to claim 12, wherein the drive and driven members are interconnected by a belt.

17. The dough mixing apparatus according to claim 3, wherein the actuator constitutes a spring biased lever.

18. The dough mixing apparatus according to claim 7, further comprising: a breaker bar extending between the first and second end walls within the internal mixing chamber, wherein both the elongated blade element and the spring biased lever are rotatably supported by the breaker bar.

19. The dough mixing apparatus according to claim 3, further comprising: at least one proximity switch for sensing a repositioning of the elongated blade element.

20. The dough mixing apparatus according to claim 1, wherein the elongated cutting blade is spaced from the operational path in the cutting position such that a clearance is established between the elongated cutting blade and each of the plurality mixing elements during rotation of the plurality of mixing elements.

21. A dough mixing apparatus comprising:
a tub having first and second end walls interconnected with at least one side wall which collectively define an internal batch mixing chamber adapted to be charged with ingredients for making a batch of dough, said tub being provided with an opening for discharging dough formed in the internal batch mixing chamber;
a plurality of mixing elements mounted for rotation about an axis within the internal batch mixing chamber along an operational path for mixing the ingredients into a mass of dough; and
a cutting mechanism mounted for movement relative to the tub, said cutting mechanism including an elongated blade element movable between a non-cutting position, wherein the elongated blade element is located remote from the plurality of mixing elements so as to not interfere with mixing of the ingredients in the internal batch mixing chamber, and a cutting position, wherein the elongated blade element is arranged directly adjacent the operational path and within the mixing chamber, closer to the axis of the plurality of mixing elements than when in the non-cutting position, such that the mass of dough is forced into contact with the elongated blade element by the plurality of mixing elements as the plurality of mixing elements rotate to cause cutting of the mass of dough and assist in the discharge of the dough from the internal batch mixing chamber through the opening.

22. The dough mixing apparatus of claim 21, wherein the blade element of the cutting mechanism is mounted within the internal batch mixing chamber.

* * * * *